June 9, 1936.   M. TARASUK   2,043,679

UNIVERSAL CUTTING TOOL

Filed May 16, 1935

INVENTOR.
Michael Tarasuk
BY
Samuel Weisman
ATTORNEY.

Patented June 9, 1936

2,043,679

UNITED STATES PATENT OFFICE 2,043,679

UNIVERSAL CUTTING TOOL

Michael Tarasuk, Hamtramck, Mich.

Application May 16, 1935, Serial No. 21,764

2 Claims. (Cl. 82—1)

The present invention pertains to a tool for performing numerous cutting operations such as facing, round grooving, boring and outside turning. The principal object of the invention is to provide such a tool operable by a small power machine and thereby accomplishing work that ordinarily requires the use of heavy and expensive machinery.

The tool has a spindle adapted to be inserted in the chuck of a milling machine, drill press or lathe. The body of the tool carries a slidable cutter carrier which is shifted through a suitable clutch and gearing arrangement for constantly varying the turning radius of the cutter in the operation of the tool. This action is used for facing and grooving operations where the depth cut is very slight, and in which case the driving machine is adjusted not to move the spindle axially towards the work.

For boring, turning and other operations requiring a constant radius, the clutch is disengaged so that the carrier does not shift. A large cutting radius may thus be had by the combination of the tool with a comparatively small power machine. By the same means, the above mentioned facing operation can be performed progressively on a large area by merely shifting the work on the table of the machine.

The invention further includes an adjustable stop mechanism for declutching and discontinuing the shifting of the cutter when the latter reaches a predetermined distance from the axis of the spindle.

The invention is fully disclosed by way of example in the following description and in the accompanying drawing in which Figure 1 is an elevation of the device, partly in section;

Reference to these views will now be made by use of like characters which are employed to designate corresponding parts throughout.

Figure 1:
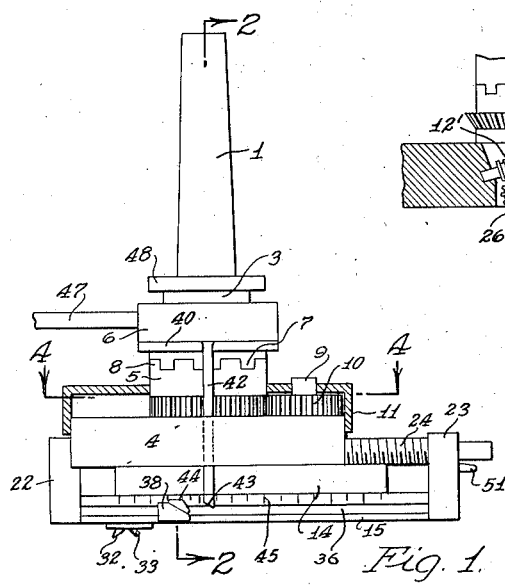
Figure 2:
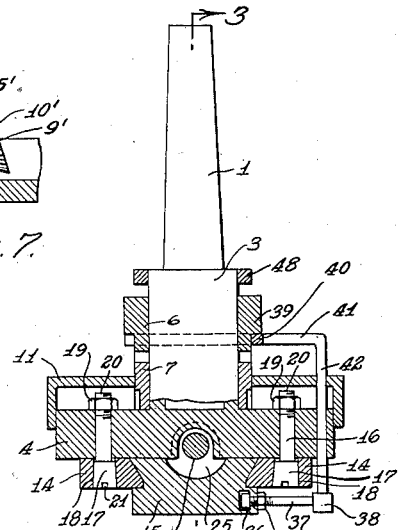
Figure 2 is a section on the line 2—2 of Figure 1.
Figure 3:
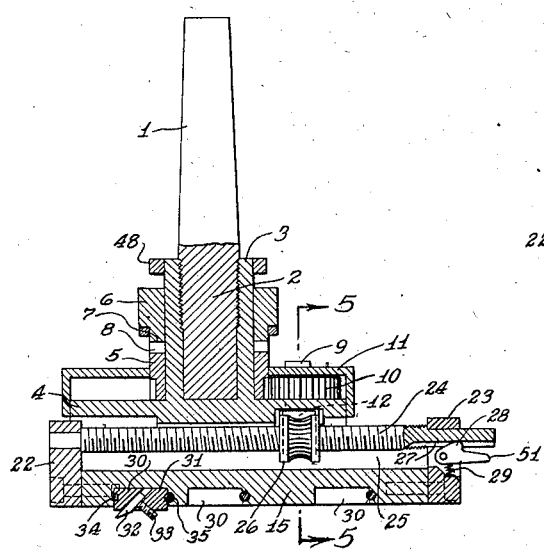
Figure 3 is a section on the line 3—3 of Figure 2.

In Figures 1, 2, and 3 the tool is shown as comprising a tapered spindle 1 of usual construction and adapted for insertion in the chuck of a milling machine, drill press, lathe or similar machine. On the cylindrical end spindle 2 is threaded a sleeve 3 for a purpose which will presently appear. Below the end spindle 2 is formed a rather heavy circular body member 4.

A ring gear 5 is loosely mounted on the sleeve 3 and rests upon the body 4 as shown more clearly in Figures 2 and 3. Above this member, a clutch member 6 is likewise slidably mounted on the sleeve 2 and is formed at its lower end with teeth 7 adapted to engage between similar teeth 8 on the upper end of the ring gear 5.

Figure 5:
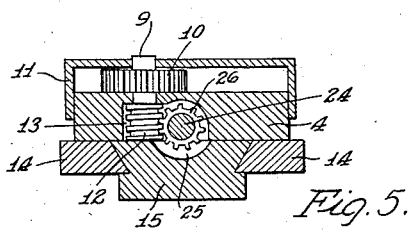
Figure 5 is a section on the line 5—5 of Figure 3.

Adjacent to the ring gear 5 is mounted a vertical stub shaft 9 carrying a pinion 10 resting upon the body 4 and meshing with the ring gear 5. A cover 11 is preferably mounted on the body 4 to enclose the pinion 10 and the teeth of the gear 5 and also to journal the upper end of the shaft 9 as may be seen in Figure 5. The lower end of the shaft 9 is formed with a worm 12 accommodated in a suitable cavity 13 formed in the body 4.

To the bottom face of the body 4 are attached two spaced rails 14 forming a dovetail track for slidably receiving a tool carrier 15. The attachment of the rails is made by means of a plurality of bolts 16 each having an eccentric tapered head 17 received in a similar hole 18 through the corresponding member 14. The bolts are tightened by nuts 19 on the threaded ends 20 thereof exposed at the top of the body. The eccentric formation of the heads 17 permits lateral adjustment of the rails 14 to take up the wear, the adjustment being secured by driving the heads into their tapered openings and then tightening the nuts 19. The heads are preferably provided with a screwdriver slot 21 for the lateral adjustment.

Figure 4:
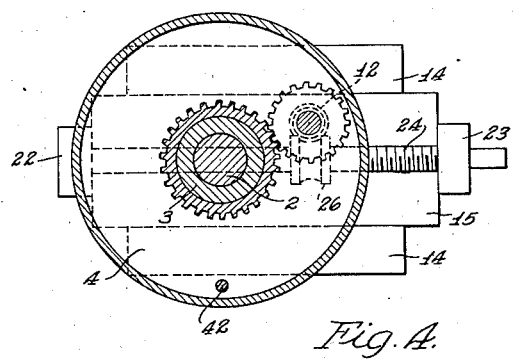
Figure 4 is a plan section on the line 4—4 of Figure 1.

Blocks 22 and 23 are carried respectively by the ends of the carrier 15 to journal a threaded shaft 24 extending between and parallel to the rails 14 and received in a suitable opening 25 formed in the body 4 and carrier 15. On this shaft is threaded a worm gear 26 matching with the worm 12 as clearly illustrated in Figures 4 and 5.

The end of the shaft 24 received in the block 23 is formed with a lengthwise key slot 27. In the block 23 is pivotally mounted a dog 28 normally held in the slot 27 by means of a coil spring 29.

In the lower face of the carrier 15 are formed several sockets 30 adapted to receive respectively a cutter holder 31 according to the nature of the work to be done, as will presently be described. In the holder is inserted the cutter 32 which is held by a set screw 33. The holders 31 are circular in order to bring the point of the cutter in the center line of the carrier 15 after grinding. The holder 31 is formed with a peripheral groove 34 adapted to receive a binding and tightening screw 35 to hold the holder against shifting, at least when it is in one of the end sockets.

One side of the carrier 15 is formed with a lengthwise T-slot 36 receiving the head of a bolt 37 adjustable therein. The outer end of the bolt carries a wedge 38 for a purpose which will presently appear. Beneath a shoulder 39 at the top of the member 6 is a fork or half collar 40 from which extends a stem 41. A stop member 42 extends downward from the outer end of the member 41, passing loosely through the cover 11 and body 4 as shown in Figure 2, and formed at its lower end with a sloped surface 43 complementary to the upper surface of the wedge 38. For certain purposes in the operation of the device presently to be described, the bolt 37 is tightened in an adjusted position in the slot 36 by means of a nut 44, the adjustment being indicated by graduations 45 along the slot 36.

A cotter-pin 46 in the member 42 rests on the cover 11 and prevents the member from dropping.

An anchoring rod 47 is screwed into the shoulder 39 and is attached to some fixed part of the machine in such a manner as to prevent the clutch from disengaging when it is intended to remain engaged.

In the operation of the device, let it first be assumed that a facing job is to be done. The point of the tool is preferably set in the axis of the spindle. The clutch is engaged, and the power machine in which the spindle is inserted is adjusted to have no movement against the work.

The turning of the spindle obviously turns the body 4, the rails 14, the carrier 15 and parts carried thereby. The clutch being engaged, the ring gear 5 remains stationary, or may be said to turn relatively to the spindle. Consequently there is axial rotation of pinion 10 and worm gear 26 which is threaded on the shaft 24. The shaft 24 is locked against rotation by the dog 28 so that the rotation of the worm gear 26 moves the shaft lengthwise and with it the carrier 15 and cutter 32. The constantly increasing turning radius of the cutter effects a facing operation. If it is desired to stop this operation when a given maximum radius has been reached, the bolt 37 is adjusted accordingly in the T-slot 36 to cause the wedge 38 to lift the member 42 and clutch member 6 at the proper time. The release of the clutch interrupts the drive through the gearing, and thereafter the cutter 32 remains on a fixed radius. A collar 48 at the top of the sleeve 3 prevents unnecessary and undesirable upward movement of the clutch member 6.

A round grooving operation is performed in the same manner except that the cutter 32 is initially set, by adjustment of the screw shaft 24 presently to be described, a distance from the axis of the spindle equal to the internal diameter of the groove, and the outside diameter is determined by adjustment of the wedge 38 as already described.

Figure 6:
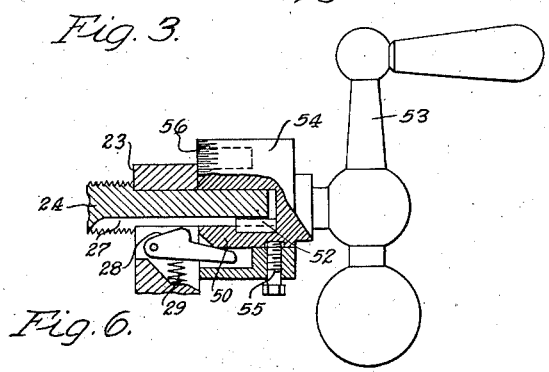
Figure 6 is a section, partly in elevation, of the adjusting tool.

The screw shaft 24 is turned freely, for adjusting the carrier 15 and cutter 32 from the axis of the spindle without turning the spindle, by means of an angular wedge 50 receivable on an end of the shaft and adapted to bear against the finger 51 of the dog 28 to remove the latter from the slot 27 as shown in Figure 6. The member 30 carries an internal key 52 adapted to enter the slot, and the shaft 24 is turned freely by turning the crank 53 carried by the member 50. In some cases it is necessary to adjust the shaft very accurately, and for this purpose a graduated ring 54 surrounds the member 50 and is secured thereto by a set-screw 55. The peripheral graduations 56 on the ring co-operate with a suitable index on the block 23 but not appearing in the drawing. The graduations 56 read in terms of distance through which the cutter 32 is moved on turning the crank 53.

For a boring operaton, a boring bar is inserted in the holder 1, and the carrier 15 adjusted to the proper radius by turning the shaft 24 freely with reference to graduations 56, in one or more steps, according to the amount of metal the cutter can remove at one time. Since the initial radius is to remain throughout the entire operation, the clutch is disengaged from the beginning. This is done by merely moving the wedge 38 to disengage the clutch, before the boring operation is commenced.

An outside turning operation is accomplished in the same manner, except that a proper turning tool is used.

The wall of the hole 25 is preferably positioned very close to the member 26 to serve as a bearing for the latter and to prevent bending of the shaft 24.

Figure 7:
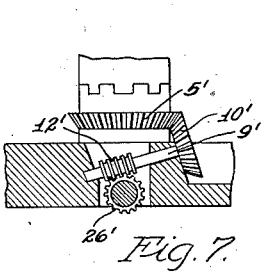
Figure 7 is a detail of a modified construction.

A somewhat different form of drive is illustrated in the modification shown in Figure 7. The ring gear 5 is replaced by a bevel ring gear 5'. The worm gear 26' is similar to the worm 26 of the previous construction. The stub shaft 9 is replaced by an angular shaft 9' suitably journaled in the body and carrying a bevel pinion 10' meshing with the gear 5'. A worm 12' on the inner end of the shaft 9' meshes with the worm gear 26'. Otherwise, the construction and operation are as described in Figures 1 to 6 inclusive.

Although specific embodiments of the invention have been illustrated and described, it will be understood that various alterations in the details of construction may be made without departing from the scope of the invention, as indicated by the appended claims.

What I claim is:

1. A universal cutting tool comprising a spindle having a body formed at one end thereof, a ring gear loosely mounted on said spindle, a clutch for holding said gear fixed while said spindle turns, a tool carrier slidably supported by said body, a screw shaft journaled on said carrier, a nut on said shaft and geared to said ring gear, said shaft having a lengthwise slot, a dog pivoted to said carrier and normally entering said slot to hold said shaft against rotation, and a manual key engageable on said shaft in keyed relation thereto and having a portion adapted to release said dog from said slot, whereby said shaft may be manually turned to adjust said carrier.

2. A universal cutting tool comprising a spindle having a body formed at one end thereof, a ring gear loosely mounted on said spindle, a clutch for holding said gear fixed while said spindle turns, a tool carrier slidably supported by said body, a screw shaft journaled on said carrier, a nut on said shaft and geared to said ring gear, said shaft having a lengthwise slot, a dog pivoted to said carrier and normally entering said slot to hold said shaft against rotation, and a manual key engageable on said shaft in keyed relation thereto and having a portion adapted to release said dog from said slot, whereby said shaft may be manually turned to adjust said carrier, said key having a series of graduations thereon concentric with said shaft, whereby the adjustment of said shaft may be accurately determined.

MICHAEL TARASUK.